United States Patent [19]

Vonk et al.

[11] Patent Number: 5,691,290
[45] Date of Patent: Nov. 25, 1997

[54] CLEANING COMPOSITION

[75] Inventors: Pieter Vonk, Gouda; Anette Heymann, Frederiksberg, both of Netherlands

[73] Assignee: Unichema Chemie B.V., Gouda, Netherlands

[21] Appl. No.: 492,013

[22] PCT Filed: Jan. 4, 1994

[86] PCT No.: PCT/EP94/00018

§ 371 Date: Sep. 21, 1995

§ 102(e) Date: Sep. 21, 1995

[87] PCT Pub. No.: WO94/17143

PCT Pub. Date: Aug. 4, 1994

[30] Foreign Application Priority Data

Jan. 19, 1993 [EP] European Pat. Off. ........... 93200122.5

[51] Int. Cl.$^6$ ................ C11D 3/32; C11D 3/44; C11D 7/50; B08B 3/08

[52] U.S. Cl. ............ 510/212; 510/202; 510/203; 510/413; 510/407; 510/406; 510/438; 510/439; 510/242; 510/401; 134/38

[58] Field of Search .............. 252/153, 542, 252/170, 171; 510/212, 202, 203, 413, 407, 406, 438, 439, 242, 401; 134/38

[56] References Cited

U.S. PATENT DOCUMENTS

| | | | |
|---|---|---|---|
| 3,954,648 | 5/1976 | Belcak et al. | 252/158 |
| 4,293,347 | 10/1981 | Haschke et al. | 134/11 |
| 4,376,118 | 3/1983 | Daher et al. | 424/227 |
| 5,145,671 | 9/1992 | Castrogiovanni et al. | 424/61 |
| 5,466,390 | 11/1995 | Houghton et al. | 510/407 |

FOREIGN PATENT DOCUMENTS

| | | |
|---|---|---|
| 407952 | 7/1990 | European Pat. Off. . |
| 442271 | 1/1991 | European Pat. Off. . |
| 3815589 | 11/1989 | Germany . |
| 4068091 | 3/1992 | Japan . |
| 4068092 | 3/1992 | Japan . |
| 4068095 | 3/1992 | Japan . |

OTHER PUBLICATIONS

Mellan, I., *Industrial Solvents Handbook* second edition, Noyes Data Corporation NJ 1977 (p. 500)

Primary Examiner—Douglas J. McGinty
Attorney, Agent, or Firm—Cushman Darby & Cushman IP Group Pillsbury Madison & Sutro LLP

[57] ABSTRACT

A cleaning composition to remove unwanted paint, graffiti or other coatings from a substrate comprises 40–90 wt. % of a five-membered ring lactam, such as N-methyl-2-pyrrolidone, and 10–60 wt. % of a glycerol triester of a C1–C4 saturated aliphatic monocarboxylic acid. Additionally, up to 25 wt. % of the composition of diethylphthalate, diisopropyl adipate and/or a C1–C4 alkyl lactate may be present. Also a method of cleaning substrates and woven or non-woven tissue impregnated with the cleaning composition has been claimed.

12 Claims, No Drawings

CLEANING COMPOSITION

The present invention relates to a cleaning composition to remove unwanted paint and graffiti from a substrate and to a method of removing unwanted paint, graffiti and other coatings from a substrate.

The application of graffiti and other unwanted paintings or coatings on a surface of buildings etc. is a great concern, particularly in the Western urban areas. Usually, the graffiti are applied by spray cans on to various types of surfaces, the cleaning of which, if at all possible, is a very time-consuming and costly affair and not seldom leads to irreparable damage of the substrate.

A number of removing compositions have been proposed in the past. Thus, it has been proposed in WO-A-88/08445 (Coroman Industries Inc.) to prepare graffiti-removing compositions from a solvent, such as mineral spirit, toluene, glycol ethers, fatty acids and chlorinated hydrocarbons, the solvent also comprising an effective amount of N-methyl-2-pyrrolidone and a surface-active agent.

The use of such solvents is highly undesirable, however, owing to their flammability, volatility and sometimes also toxicity and to the fact that they are not, or only partially, biodegradable. A number of these solvents are also not miscible with water so that, for instance, high-pressure water jet cleaning methods entail problems.

In order to avoid the use of toxic organic solvents such as the chlorinated hydrocarbons, it has also been proposed in WO-A-88/06640 (GAF Corp.) to use a mixture of 10–50 wt. % of N-methyl-2-pyrrolidone, 30–65 wt. % of an alkylene glycol ether and 5–35 wt. % of a C2–C11 organic carboxylic acid (preferably formic and acetic acid). The composition may also contain surfactants, corrosion inhibitors and thickeners. Although the toxicity and flammability of these compositions are indeed reduced, there is still the inconvenience of working with appreciable amounts of corrosive and rather aggressive acids.

Finally, it has been proposed in U.S. Pat. No. 4,780,235 (E.I. DuPont de Nemours and Corp.) to prepare a paint remover from 1–80 wt. % of at least one non-halogen-containing organic solvent, such as N-methyl-2-pyrrolidone and at least 20 wt. % of at least one $C_1$–$C_4$ dialkyl ester of a $C_4$–$C_6$ aliphatic dibasic acid, together with an activator (basic or acidic), a thickener and compatible surfactant. The presence of the activator is mandatory.

The present invention provides a cleaning composition to remove unwanted paint, graffiti or other coatings from surfaces or substrates, which has a very low volatility (low V.O.C.) and flammability, is water-miscible and biodegradable, and has a high dissolving power for the material to be removed from the substrate. It has been found in extensive experiments that a binary composition comprising a five-membered ring lactam and glycerol triacetate (triacetin) exhibits these optimal cleaning properties and at the same time meets the other requirements of low volatility, flammability, toxicity, high biodegradability and water-miscibility. The action of the binary composition can even be improved if certain esters are present as a third component.

Therefore, the present invention relates to a cleaning composition to remove unwanted paint, graffiti and other coatings from a substrate, which consists of:

(1) a five-membered ring lactam of the general formula

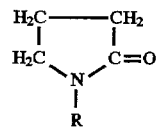

in which R represents a hydrogen atom, or a methyl, an ethyl, a propyl, an isopropyl or a vinyl group, and
(2) a glycerol triester of an aliphatic saturated monocarboxylic acid having from 1 to 4 carbon atoms.

Preferably, the five-membered ring lactam is N-methyl-2-pyrrolidone, which is, for example, sold under the Trade Mark MPyrol by the General Aniline and Film Corp (USA) having a flash point (open cup) of 95° C.

The glycerol triester of a C1–C4 aliphatic saturated monocarboxylic acid preferably is the glycerol triester of acetic acid (or triacetin). The glycerol triester may be derived from more than one monocarboxylic acid and also mixtures of esters may be used.

The action of the binary mixture is even enhanced if also diethyl phthalate, diisopropyl adipate and/or esters of lactic acid and saturated aliphatic monohydric alcohols with 1–4 carbon atoms are (is) present.

Also up to 10% by weight, preferably up to 5% by weight of the total composition of functional additives, such as surfactants or wetting agents (preferably of the nonionic type), thickening or gelling agents (such as silica benzylidene sorbitol or cellulose derivatives), corrosion inhibitors, colouring agents and deodorizing agents, and mixtures thereof may be added.

The compositions according to the present invention can be applied by brush, spray or wiped and can be used for all types of substrates, such as brick, concrete, metal, plexiglass, plastic (such as PVC, PE, etc.), wood, ceramic material and the like. The substrate may also be at least partially coated, painted, lacquered, etc. and may also be a composite material.

For small areas to be cleansed, the compositions according to the present invention can also be applied by means of a spray can or aerosol applicator. In that case a propellant is needed, which is preferably non-toxic and does not attack the ozone layer, such as, for example, carbon dioxide.

The relative amounts of the various components of the cleaning compositions according to the present invention vary from 40 to 90 wt. % of the total composition of the five-membered ring lactam, and from 10 to 60 wt. % of the total composition of the glycerol C1–C4 triester. If the ester component is present, the composition contains up to 25 wt. % of the ester component. Preferably, the composition comprises 50–60 wt. % of the total composition of the five-membered ring lactam and 40–50 wt. % of the total composition of the glycerol C1–C4 triester. The ester component may also be a mixture of the two esters.

The present invention also relates to a method of removing unwanted paint, graffiti or other coatings from a substrate, which comprises contacting the substrate with the unwanted paint, graffiti or other coatings to be removed with an effective amount of the cleaning composition according to the present invention for a period of time sufficient to bring about efficient removal of the unwanted substance from the substrate, after which the cleaning composition is removed from the substrate.

Generally, the cleaning composition is allowed to react for a period of time ranging from 1 to 60 minutes, dependent on the nature of the substrate and on the nature and thickness of the layer of paint to be removed.

Finally, the present invention also relates to woven or non-woven tissue material which has been impregnated with the cleaning composition according to the present invention.

The invention will now be illustrated by the following Examples.

EXAMPLE I

An alkyd-based paint (hereafter referred to as Alk-P) or an acrylate-based paint (hereafter referred to as Acr-P) was applied in one or more layers to a number of substrates, viz. cement and brick, glass, plastic, aluminium, wood and iron. Also letters and patterns were made on the same substrate by a marking pen.

The paint or marking was applied to the surface to be tested and the coating was dried in the time prescribed on the spray can or the marking pen plus 1 day.

The cleaning composition was then applied to the area to be cleansed by means of a brush and the cleaning composition was allowed to remain undisturbed until the layer of paint or marking started to dissolve or to blister off the substrate. At that time, the layer of paint was scrubbed off the substrate by means of a hard brush or wiped off with a wet cloth. Finally, the substrate was rinsed with tap water.

If, owing to the thickness of the layer, an amount of paint or ink remained on the substrate, the cleansing procedure as described was repeated.

A cleaning composition of 50 wt. % of N-methyl-2-pyrrolidone (NMP), 40 wt. % of triacetin (TA) and 10 wt. % of diethyl phthalate was applied to one layer of Alk-P and one layer of Acr-P, which were both applied to a coated concrete surface by means of a brush. After 2 minutes, the total graffiti "piece" of each of the two types of paint was totally removed, using a wet cloth.

The same excellent result was obtained when the substrate was a tile.

EXAMPLE II

Four layers of differently coloured Alk-P were applied on top of each other on to a concrete substrate and the same was done with four differently coloured layers of Acr-P.

A cleaning composition of 40 wt. % of NMP, 30 wt. % of TA and 30 wt. % of diisopropyl adipate, which contained 2 wt. % of Aerosil 200 (a fumed silica; trade mark, ex Degussa, Germany; based on the total composition) to impart thixotropy to the cleaning composition, was applied by a brush to the layer of paint. After 5 minutes, the graffiti spots were brushed with a hard brush and rinsed off with tap water. Three out of the four layers were partially removed and one of the four layers was totally removed.

When the procedure was repeated, only a small part of the last layer of paint still adhered to the substrate. A slightly better thixotropy was reached, when the level of Aerosil-2000 was increased to 4% by weight.

EXAMPLE III

Example I was repeated, but now using a cleaning composition of 50 wt. % of NMP and 50 wt. % of TA. After 2 minutes, almost all of the graffiti spots were removed.

EXAMPLE IV

Example I was repeated, but now using a cleaning composition of 40 wt % of NMP, 30 wt % of TA, 15 wt % of di(isopropyl) adipate and 15 wt % of diethyl phthalate. After 3 minutes all the graffiti spots were removed.

EXAMPLE V

Example I was repeated, but now using a cleaning composition of 40 wt % of NMP, 30 wt % of TA and 30 wt % of ethyl lactate.

Two layers of equally coloured Alk-P and two layers of equally coloured Acr-P were applied on different spots on aluminium and on glass. The layers were left to harden for 3 weeks.

After application of the cleaning composition the Alk-P could be removed after 5 minutes and the Acr-P after 10 minutes.

We claim:

1. A cleaning composition to remove unwanted paint, graffiti or other coatings from a substrate which consists essentially of:

(1) from 40% to 90% by weight of the total composition of a five-membered ring lactam of the general formula

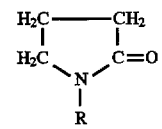

in which R represents a hydrogen atom, or a methyl, an ethyl, a propyl, an isopropyl or a vinyl group, and (2) from 10% to 60% by weight of the total composition of a glycerol triester of an aliphatic saturated monocarboxylic acid having from 1 to 4 carbon atoms; and (3) an effective amount of up to 25 wt. % of the total composition of a member of the group consisting of diethyl phthalate, diisopropyl adipate and esters of lactic acid and a saturated aliphatic monohydric alcohol having from 1 to 4 carbon atoms.

2. A cleaning composition according to claim 1, in which the five-membered ring lactam is N-methyl-2-pyrrolidone.

3. A cleaning composition according to claim 1, in which the glycerol triester is glycerol triacetate.

4. A cleaning composition according to claim 1, which further consists essentially of from 50% to 60% by weight of the total composition of the five-membered ring lactam and from 40% to 50% by weight of the total composition of the glycerol triester.

5. A cleaning composition according to claim 1, in which the ester of lactic acid is ethyl lactate or butyl lactate.

6. A cleaning composition according to claim 1, which further consists essentially of up to 10 wt. % of the total composition of a functional additive selected from the group consisting of surfactants, thickening agents, corrosion inhibitors, colouring agents, deodorizing agents, moisturizers, emollients, abrasives and mixtures thereof.

7. A cleaning composition according to claim 1, which further consists essentially of a thickening agent selected from the group consisting of silica, benzylidene sorbitol, cellulose derivatives and mixtures thereof.

8. A cleaning composition according to claim 1, which further consists essentially of a non-ionic surfactant.

9. A woven or non-woven tissue material which has been impregnated with the cleaning composition according to claim 1.

10. A spray can or aerosol applicator containing a cleaning composition according to claim 1.

11. A method of removing unwanted paint, graffiti or other coatings from a substrate, comprising the steps of:

(a) contacting the substrate with the unwanted paint, graffiti or other coating to be removed with an effective amount of the cleaning composition according to claim 1 for a period of time sufficient to bring about efficient removal of the unwanted substance from the substrate, and (b) removing the cleaning composition from the substrate.

12. The method of claim 11 wherein the substrate is contacted with said composition by rubbing the substrate with woven or non-woven tissue impregnated with said composition.

* * * * *